(12) United States Patent
Meshi et al.

(10) Patent No.: US 11,799,880 B2
(45) Date of Patent: Oct. 24, 2023

(54) NETWORK ADAPTIVE ALERT PRIORITIZATION SYSTEM

(71) Applicant: PALO ALTO NETWORKS (ISRAEL ANALYTICS) LTD., Tel Aviv (IL)

(72) Inventors: Yinnon Meshi, Kibbutz Revivim (IL); Rony Brailovsky, Tel Aviv-Jaffa (IL); Jonathan Allon, Haifa (IL); Asaf Dahan, Raanana (IL); Gal Itzhak, Holon (IL); Niv Sela, Tel Aviv-Jaffa (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 108 days.

(21) Appl. No.: 17/571,558

(22) Filed: Jan. 10, 2022

(65) Prior Publication Data
US 2023/0224311 A1 Jul. 13, 2023

(51) Int. Cl.
H04L 9/40 (2022.01)
H04L 41/0604 (2022.01)
H04L 41/0631 (2022.01)

(52) U.S. Cl.
CPC ...... *H04L 63/1416* (2013.01); *H04L 41/0609* (2013.01); *H04L 41/0631* (2013.01); *H04L 63/20* (2013.01)

(58) Field of Classification Search
CPC ............ H04L 63/1416; H04L 41/0609; H04L 41/0631; H04L 63/20
(Continued)

(56) References Cited

U.S. PATENT DOCUMENTS 5,991,881 A 11/1999 Conklin et al.
6,347,374 B1 2/2002 Drake et al.
(Continued)

FOREIGN PATENT DOCUMENTS

CN 103561048 A 2/2014
EP 0952521 A2 10/1999
(Continued)

OTHER PUBLICATIONS

International Application # PCT/IB2022/059544 Search Report dated Jan. 20, 2023.
(Continued)

*Primary Examiner* — Badri Narayanan Champakesan
(74) *Attorney, Agent, or Firm* — KLIGLER & ASSOCIATES PATENT ATTORNEYS LTD

(57) ABSTRACT

A method, including receiving, from multiple sources, respective sets of incidents, and respective suspiciousness labels for the incidents. A set of rules are applied so as to assign training labels to respective incidents in a subset of the incidents in the received sets. For each given incident in the subset, the respective training label is compared to the respective suspiciousness label so as to compute a respective quality score for each given source. Any sources having respective label quality scores meeting a predefined criterion are identified, and a model for computing predicted labels is fit to the incidents received from the identified sources and the respective suspiciousness labels of the incidents. The model is applied to an additional incident received from one of the sources to compute a predicted label for the additional incident, and a notification of the additional incident is prioritized in response to the predicted label.

25 Claims, 4 Drawing Sheets

(58) Field of Classification Search
USPC .......................................................... 726/22
See application file for complete search history.

(56) References Cited

U.S. PATENT DOCUMENTS

| | | |
|---|---|---|
| 6,704,874 B1 | 3/2004 | Porras et al. |
| 7,003,790 B1 | 2/2006 | Inoue et al. |
| 7,007,301 B2 | 2/2006 | Crosbie et al. |
| 7,178,164 B1 | 2/2007 | Bonnes |
| 7,181,769 B1 | 2/2007 | Keanini et al. |
| 7,523,016 B1 | 4/2009 | Surdulescu et al. |
| 7,684,568 B2 | 3/2010 | Yonge, III et al. |
| 7,694,150 B1 | 4/2010 | Kirby |
| 7,703,138 B2 | 4/2010 | Desai et al. |
| 7,712,134 B1 | 5/2010 | Nucci et al. |
| 7,752,665 B1 | 7/2010 | Robertson et al. |
| 7,908,655 B1 | 3/2011 | Bhattacharyya et al. |
| 8,245,298 B2 | 8/2012 | Pletka et al. |
| 8,397,284 B2 | 3/2013 | Kommareddy et al. |
| 8,429,180 B1 | 4/2013 | Sobel et al. |
| 8,490,190 B1 | 7/2013 | Hernacki et al. |
| 8,516,573 B1 | 8/2013 | Brown et al. |
| 8,555,388 B1 | 10/2013 | Wang et al. |
| 8,578,345 B1 | 11/2013 | Kennedy et al. |
| 8,607,353 B2 | 12/2013 | Rippert, Jr. et al. |
| 8,620,942 B1 | 12/2013 | Hoffman et al. |
| 8,677,487 B2 | 3/2014 | Balupari et al. |
| 8,762,288 B2 | 6/2014 | Dill |
| 8,769,681 B1 | 7/2014 | Michels et al. |
| 8,925,095 B2 | 12/2014 | Herz et al. |
| 8,966,625 B1 | 2/2015 | Zuk et al. |
| 9,038,178 B1 | 5/2015 | Lin |
| 9,118,582 B1 | 8/2015 | Martini |
| 9,147,071 B2 | 9/2015 | Sallam |
| 9,231,962 B1 | 1/2016 | Yen et al. |
| 9,319,421 B2 * | 4/2016 | Ferragut ............ H04L 63/1425 |
| 9,342,691 B2 | 5/2016 | Maestas |
| 9,378,361 B1 | 6/2016 | Yen et al. |
| 9,386,028 B2 | 7/2016 | Altman |
| 9,531,614 B1 | 12/2016 | Nataraj et al. |
| 9,531,736 B1 | 12/2016 | Torres et al. |
| 9,690,933 B1 * | 6/2017 | Singh ...................... G06N 5/025 |
| 9,736,251 B1 | 8/2017 | Samant et al. |
| 9,773,112 B1 | 9/2017 | Rathor et al. |
| 9,979,739 B2 | 5/2018 | Mumcuoglu et al. |
| 9,979,742 B2 | 5/2018 | Mumcuoglu et al. |
| 10,027,694 B1 | 7/2018 | Gupta et al. |
| 10,075,461 B2 | 9/2018 | Mumcuoglu et al. |
| 10,140,453 B1 | 11/2018 | Fridakis |
| 10,237,875 B1 | 3/2019 | Romanov |
| 10,706,144 B1 | 7/2020 | Moritz et al. |
| 10,728,281 B2 | 7/2020 | Kurakami |
| 10,904,277 B1 | 1/2021 | Sharifi Mehr |
| 2002/0059078 A1 | 5/2002 | Valdes et al. |
| 2002/0133586 A1 | 9/2002 | Shanklin et al. |
| 2003/0110396 A1 | 6/2003 | Lewis et al. |
| 2003/0133443 A1 | 7/2003 | Klinker et al. |
| 2004/0003286 A1 | 1/2004 | Kaler et al. |
| 2004/0015728 A1 | 1/2004 | Cole et al. |
| 2004/0117658 A1 | 6/2004 | Klaes |
| 2004/0199793 A1 | 10/2004 | Wilken et al. |
| 2004/0210769 A1 | 10/2004 | Radatti et al. |
| 2004/0250169 A1 | 12/2004 | Takemori et al. |
| 2004/0260733 A1 | 12/2004 | Adelstein et al. |
| 2005/0015624 A1 | 1/2005 | Ginter et al. |
| 2005/0060295 A1 | 3/2005 | Gould et al. |
| 2005/0069130 A1 | 3/2005 | Kobayashi |
| 2005/0071330 A1 | 3/2005 | Douceur et al. |
| 2005/0123138 A1 | 6/2005 | Abe et al. |
| 2005/0128989 A1 | 6/2005 | Bhagwat et al. |
| 2005/0183120 A1 | 8/2005 | Jain et al. |
| 2005/0216749 A1 | 9/2005 | Brent |
| 2005/0262556 A1 | 11/2005 | Waisman et al. |
| 2005/0262560 A1 | 11/2005 | Gassoway |
| 2005/0268112 A1 | 12/2005 | Wang et al. |
| 2005/0286423 A1 | 12/2005 | Poletto et al. |
| 2006/0018466 A1 | 1/2006 | Adelstein et al. |
| 2006/0075462 A1 | 4/2006 | Golan |
| 2006/0075492 A1 | 4/2006 | Golan et al. |
| 2006/0075500 A1 | 4/2006 | Bertman et al. |
| 2006/0107321 A1 | 5/2006 | Tzadikario |
| 2006/0126522 A1 | 6/2006 | Oh |
| 2006/0136720 A1 | 6/2006 | Armstrong et al. |
| 2006/0137009 A1 | 6/2006 | Chesla |
| 2006/0149848 A1 | 7/2006 | Shay |
| 2006/0156398 A1 | 7/2006 | Ross et al. |
| 2006/0161984 A1 | 7/2006 | Phillips et al. |
| 2006/0190803 A1 | 8/2006 | Kawasaki et al. |
| 2006/0191010 A1 | 8/2006 | Benjamin |
| 2006/0215627 A1 | 9/2006 | Waxman |
| 2006/0242694 A1 | 10/2006 | Gold et al. |
| 2006/0259967 A1 | 11/2006 | Thomas et al. |
| 2006/0282893 A1 | 12/2006 | Wu et al. |
| 2007/0011319 A1 | 1/2007 | McClure et al. |
| 2007/0072661 A1 | 3/2007 | Lototski |
| 2007/0073519 A1 | 3/2007 | Long |
| 2007/0116277 A1 | 5/2007 | Ro et al. |
| 2007/0124474 A1 | 5/2007 | Margulis |
| 2007/0198603 A1 | 8/2007 | Tsioutsiouliklis et al. |
| 2007/0201691 A1 | 8/2007 | Kumagaya |
| 2007/0201693 A1 | 8/2007 | Ohno |
| 2007/0218874 A1 | 9/2007 | Sinha et al. |
| 2007/0226796 A1 | 9/2007 | Gilbert et al. |
| 2007/0226802 A1 | 9/2007 | Gopalan et al. |
| 2007/0245420 A1 | 10/2007 | Yong et al. |
| 2007/0255724 A1 | 11/2007 | Jung et al. |
| 2007/0283166 A1 | 12/2007 | Yami et al. |
| 2008/0005782 A1 | 1/2008 | Aziz |
| 2008/0013725 A1 | 1/2008 | Kobayashi |
| 2008/0016339 A1 | 1/2008 | Shukla |
| 2008/0016570 A1 | 1/2008 | Capalik |
| 2008/0104046 A1 | 5/2008 | Singla et al. |
| 2008/0104703 A1 | 5/2008 | Rihn et al. |
| 2008/0134296 A1 | 6/2008 | Amitai et al. |
| 2008/0148381 A1 | 6/2008 | Aaron |
| 2008/0198005 A1 | 8/2008 | Schulak et al. |
| 2008/0244097 A1 | 10/2008 | Candelore et al. |
| 2008/0262991 A1 | 10/2008 | Kapoor et al. |
| 2008/0271143 A1 | 10/2008 | Stephens et al. |
| 2008/0285464 A1 | 11/2008 | Katzir |
| 2009/0007100 A1 | 1/2009 | Field et al. |
| 2009/0007220 A1 | 1/2009 | Ormazabal et al. |
| 2009/0115570 A1 | 5/2009 | Cusack, Jr. |
| 2009/0157574 A1 | 6/2009 | Lee |
| 2009/0164522 A1 | 6/2009 | Fahey |
| 2009/0193103 A1 | 7/2009 | Small et al. |
| 2009/0265777 A1 | 10/2009 | Scott |
| 2009/0320136 A1 | 12/2009 | Lambert et al. |
| 2010/0014594 A1 | 1/2010 | Beheydt et al. |
| 2010/0054241 A1 | 3/2010 | Shah et al. |
| 2010/0071063 A1 | 3/2010 | Wang et al. |
| 2010/0107257 A1 | 4/2010 | Ollmann |
| 2010/0146292 A1 | 6/2010 | Shi et al. |
| 2010/0146293 A1 | 6/2010 | Shi et al. |
| 2010/0146501 A1 | 6/2010 | Wyatt et al. |
| 2010/0162400 A1 | 6/2010 | Feeney et al. |
| 2010/0197318 A1 | 8/2010 | Petersen et al. |
| 2010/0212013 A1 | 8/2010 | Kim et al. |
| 2010/0217861 A1 | 8/2010 | Wu |
| 2010/0235915 A1 | 9/2010 | Memon et al. |
| 2010/0268818 A1 | 10/2010 | Richmond et al. |
| 2010/0272257 A1 | 10/2010 | Beals |
| 2010/0278054 A1 | 11/2010 | Dighe |
| 2010/0280978 A1 | 11/2010 | Shimada et al. |
| 2010/0284282 A1 | 11/2010 | Golic |
| 2010/0299430 A1 | 11/2010 | Powers et al. |
| 2011/0026521 A1 | 2/2011 | Gamage et al. |
| 2011/0035795 A1 | 2/2011 | Shi |
| 2011/0087779 A1 | 4/2011 | Martin et al. |
| 2011/0125770 A1 | 5/2011 | Battestini et al. |
| 2011/0135090 A1 | 6/2011 | Chan et al. |
| 2011/0138463 A1 | 6/2011 | Kim et al. |
| 2011/0153748 A1 | 6/2011 | Lee et al. |
| 2011/0185055 A1 | 7/2011 | Nappier et al. |

(56) References Cited

U.S. PATENT DOCUMENTS

| | | |
|---|---|---|
| 2011/0185421 A1 | 7/2011 | Wittenstein et al. |
| 2011/0214187 A1 | 9/2011 | Wittenstein et al. |
| 2011/0247071 A1 | 10/2011 | Hooks et al. |
| 2011/0265011 A1 | 10/2011 | Taylor et al. |
| 2011/0270957 A1 | 11/2011 | Phan et al. |
| 2011/0271343 A1 | 11/2011 | Kim et al. |
| 2011/0302653 A1 | 12/2011 | Frantz et al. |
| 2011/0317770 A1 | 12/2011 | Lehtiniemi et al. |
| 2012/0042060 A1 | 2/2012 | Jackowski et al. |
| 2012/0079596 A1 | 3/2012 | Thomas et al. |
| 2012/0102359 A1 | 4/2012 | Hooks |
| 2012/0136802 A1 | 5/2012 | Mcquade et al. |
| 2012/0137342 A1 | 5/2012 | Hartrell et al. |
| 2012/0143650 A1 | 6/2012 | Crowley et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0240185 A1 | 9/2012 | Kapoor et al. |
| 2012/0275505 A1 | 11/2012 | Tzannes et al. |
| 2012/0308008 A1 | 12/2012 | Kondareddy et al. |
| 2012/0331553 A1 | 12/2012 | Aziz et al. |
| 2013/0031600 A1 | 1/2013 | Luna et al. |
| 2013/0061045 A1 | 3/2013 | Kiefer et al. |
| 2013/0083700 A1 | 4/2013 | Sndhu et al. |
| 2013/0097706 A1 | 4/2013 | Titonis et al. |
| 2013/0111211 A1 | 5/2013 | Winslow et al. |
| 2013/0031037 A1 | 7/2013 | Brandt et al. |
| 2013/0196549 A1 | 8/2013 | Sorani |
| 2013/0298237 A1 | 11/2013 | Smith |
| 2013/0298243 A1 | 11/2013 | Kumar et al. |
| 2013/0333041 A1 | 12/2013 | Christodorescu et al. |
| 2014/0010367 A1 | 1/2014 | Wang |
| 2014/0013434 A1 | 1/2014 | Ranum et al. |
| 2014/0165207 A1 | 6/2014 | Engel et al. |
| 2014/0198669 A1 | 7/2014 | Brown et al. |
| 2014/0201776 A1 | 7/2014 | Minemura et al. |
| 2014/0230059 A1 | 8/2014 | Wang |
| 2014/0325643 A1 | 10/2014 | Bart et al. |
| 2015/0026810 A1* | 1/2015 | Friedrichs .............. G06F 21/564 726/23 |
| 2015/0040219 A1 | 2/2015 | Garraway et al. |
| 2015/0047032 A1 | 2/2015 | Hannis et al. |
| 2015/0071308 A1 | 3/2015 | Webb, III et al. |
| 2015/0121461 A1 | 4/2015 | Dulkin et al. |
| 2015/0156270 A1 | 6/2015 | Teraoka et al. |
| 2015/0180883 A1 | 6/2015 | Aktas et al. |
| 2015/0195300 A1 | 7/2015 | Adjaoute |
| 2015/0264069 A1 | 9/2015 | Beauchesne et al. |
| 2015/0295903 A1 | 10/2015 | Yi et al. |
| 2015/0304346 A1 | 10/2015 | Kim |
| 2015/0341380 A1 | 11/2015 | Heo et al. |
| 2015/0341389 A1 | 11/2015 | Kurakami |
| 2016/0021141 A1 | 1/2016 | Liu et al. |
| 2016/0119292 A1 | 4/2016 | Kaseda et al. |
| 2016/0127390 A1 | 5/2016 | Lai et al. |
| 2016/0142746 A1 | 5/2016 | Schuberth |
| 2016/0191918 A1 | 6/2016 | Lai et al. |
| 2016/0234167 A1 | 8/2016 | Engel et al. |
| 2016/0247163 A1 | 8/2016 | Donsky et al. |
| 2016/0315954 A1 | 10/2016 | Peterson et al. |
| 2016/0323299 A1 | 11/2016 | Huston, III |
| 2016/0359895 A1 | 12/2016 | Chiu et al. |
| 2017/0026387 A1 | 1/2017 | Vissamsetty et al. |
| 2017/0026395 A1 | 1/2017 | Mumcuoglu et al. |
| 2017/0054744 A1 | 2/2017 | Mumcuoglu et al. |
| 2017/0063921 A1 | 3/2017 | Fridman et al. |
| 2017/0078312 A1 | 3/2017 | Yamada et al. |
| 2017/0111376 A1 | 4/2017 | Friedlander et al. |
| 2017/0171229 A1 | 6/2017 | Arzi et al. |
| 2017/0262633 A1 | 9/2017 | Miserendino et al. |
| 2017/0294112 A1 | 10/2017 | Kushnir |
| 2017/0374090 A1 | 12/2017 | McGrew et al. |
| 2018/0004948 A1 | 1/2018 | Martin et al. |
| 2018/0007013 A1 | 1/2018 | Wang |
| 2018/0048662 A1 | 2/2018 | Jang et al. |
| 2018/0077189 A1 | 3/2018 | Doppke et al. |
| 2018/0288081 A1 | 10/2018 | Yermakov |
| 2018/0332064 A1 | 11/2018 | Harris et al. |
| 2019/0044963 A1 | 2/2019 | Rajasekharan et al. |
| 2019/0068620 A1 | 2/2019 | Avrahami et al. |
| 2019/0207966 A1* | 7/2019 | Vashisht ............... G06F 21/564 |
| 2019/0297097 A1 | 9/2019 | Gong et al. |
| 2019/0319981 A1 | 10/2019 | Meshi et al. |
| 2019/0334931 A1 | 10/2019 | Arlitt et al. |
| 2020/0007566 A1 | 1/2020 | Wu |
| 2020/0082296 A1* | 3/2020 | Fly .......................... G06F 17/18 |
| 2020/0145435 A1 | 5/2020 | Chiu et al. |
| 2020/0162494 A1 | 5/2020 | Rostami-Hesarsorkh |
| 2020/0195673 A1 | 6/2020 | Lee |
| 2020/0244658 A1 | 7/2020 | Meshi et al. |
| 2020/0244675 A1 | 7/2020 | Meshi et al. |
| 2020/0244676 A1 | 7/2020 | Amit et al. |
| 2020/0244683 A1 | 7/2020 | Meshi et al. |
| 2020/0244684 A1 | 7/2020 | Meshi et al. |
| 2020/0274894 A1* | 8/2020 | Argoeti ............... H04L 63/1433 |
| 2020/0285737 A1* | 9/2020 | Kraus .................. G06F 21/552 |
| 2020/0293917 A1 | 9/2020 | Wang et al. |
| 2020/0327221 A1* | 10/2020 | Street .................. H04L 63/1425 |
| 2020/0374301 A1 | 11/2020 | Manevich et al. |
| 2021/0004458 A1 | 1/2021 | Edwards et al. |
| 2021/0182387 A1 | 6/2021 | Zhu et al. |
| 2021/0224676 A1* | 7/2021 | Arzani ..................... G06N 7/01 |
| 2022/0217156 A1* | 7/2022 | Wahbo ..................... G06N 3/08 |
| 2023/0171235 A1* | 6/2023 | Chhibber .............. H04L 63/062 726/4 |

FOREIGN PATENT DOCUMENTS

| | | |
|---|---|---|
| EP | 2056559 A1 | 5/2009 |
| WO | 03083660 A1 | 10/2003 |

OTHER PUBLICATIONS

International Application # PCT/IB2022/060920 Search Report dated Feb. 7, 2023.
EP Application # 19832439.4 Office Action dated Mar. 1, 2023.
U.S. Appl. No. 17/175,720 Office Action dated Mar. 20, 2023.
International Application # PCT/IB2022/061926 Search Report dated Mar. 27, 2023.
U.S. Appl. No. 17/700,579 Office Action dated Mar. 23, 2023.
U.S. Appl. No. 17/464,716 Office Action dated Apr. 14, 2023.
U.S. Appl. No. 17/464,709 Office Action dated Apr. 14, 2023.
Light Cyber Ltd, "LightCyber Magna", pp. 1-3, year 2011.
Tier-3 Pty Ltd, "Huntsman Protector 360", Brochure, pp. 1-2, Apr. 1, 2010.
Tier-3 Pty Ltd, "Huntsman 5.7 the Power of 2", Brochure, pp. 1-2, Oct. 8, 2012.
Bilge et at., "Disclosure: Detecting Botnet Command and Control Servers Through Large-Scale NetFlow Analysis", ACSAC, pp. 1-10, Dec. 3-7, 2012.
Blum., "Combining Labeled and Unlabeled Data with Co-Training", Carnegie Mellon University, Research Showcase @ CMU, Computer Science Department, pp. 1-11, Jul. 1998.
Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.
Frosch., "Mining DNS-related Data for Suspicious Features", Ruhr Universitat Bochum, Master's Thesis, pp. 1-88, Dec. 23, 2011.
Bilge at al., "Exposure: Finding Malicious Domains Using Passive DNS Analysis ", NDSS Symposium, pp. 1-17, Feb. 6-9, 2011.
Gross et al., "Fire: Finding Rogue Networks", Annual Conference on Computer Security Applications (ACSAC'09), pp. 1-10, Dec. 7-11, 2009.
Markowitz, N., "Bullet Proof Hosting: A Theoretical Model", Security Week, [pp. 1-5, Jun. 29, 2010, downloaded from http://www.infosecisland.com/blogview/4487-Bullet-Proof-Hosting-A-Theoretical-Model.html.

(56) References Cited

OTHER PUBLICATIONS

Konte et al., "ASwatch: An AS Reputation System to Expose Bulletproof Hosting ASes", SIGCOMM, pp. 625-638, Aug. 17-21, 2015.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, pp. 1-8, Dec. 8, 2010.
Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.
Niksun, "Network Intrusion Forensic System (NIFS) for Intrusion Detection and Advanced Post Incident Forensics", Whitepaper, pp. 1-12, Feb. 15, 2010.
Shulman, A., "Top Ten Database Security Threats How to Mitigate the Most Significant Database Vulnerabilities", White Paper, pp. 1-14, year 2006.
Xu, "Correlation Analysis of Intrusion Alerts," Dissertation in Computer Science submitted to the Graduate Faculty, North Carolina State University, pp. 1-206, year 2006.
U.S. Appl. No. 17/038,285 Office Action dated Mar. 21, 2022.
"PA-3250 Next Generation Firewall," PS-3200 Series, Datasheet, Palo Alto Networks, Inc., Santa Clara, CA, USA, pp. 1-4, year 2021.
"What is PCI DSS?" Palo Alto Networks, Cyberpedia, pp. 1-5, year 2021, as downloaded from https://www.paloaltonetworks.com/cyberpedia/what-is-a-pci-dss.
Wikipedia, "Active Directory," pp. 1-14, last edited Oct. 2021.
International Application # PCT/IB2021/058621 Search Report dated Dec. 14, 2021.
Steimberg et al., U.S. Appl. No. 17/038,285, filed Sep. 30, 2020.
Rimer et al., U.S. Appl. No. 17/505,673, filed Oct. 20, 2021.
Asrigo et al., "Using VMM-based sensors to monitor honeypots," Proceedings of the 2nd International Conference on Virtual Execution Environments, pp. 13-23, Jun. 14, 2006.
Bhuyan et al., "Surveying Port Scans and Their Detection Methodologies", Computer Journal, vol. 54, No. 10, pp. 1565-1581, Apr. 20, 2011.
Skormin, "Anomaly-Based Intrusion Detection Systems Utilizing System Call Data", Watson School of Engineering at Binghamton University, pp. 1-82, Mar. 1, 2012.
Palo Alto Networks, "Cortex XDR", datasheet, pp. 1-7, year 2020.
Palo Alto Networks, "WildFire", datasheet, pp. 1-6, year 2020.
Barford et al., "Characteristics of Network Traffic Flow Anomalies," Proceedings of the 1st ACM Sigcomm Workshop on Internet Measurement, pp. 69-73, year 2001.
U.S. Appl. No. 17/175,720 Office Action dated Nov. 7, 2022.
U.S. Appl. No. 17/506,713 Office Action dated Nov. 8, 2022.
Brownlee et al., "Traffic Flow Measurement: Architecture," Request for Comments 2722, Network Working Group, pp. 1-48, Oct. 1999.

\* cited by examiner

NETWORK ADAPTIVE ALERT PRIORITIZATION SYSTEM

FIELD OF THE INVENTION

The present invention relates generally to computer security and networks, and particularly to improving Security Operations Center (SOC) efficiency and coverage with a network adaptive cybersecurity incident prioritization system.

BACKGROUND OF THE INVENTION

Security operations centers (SOCs) comprise facilities where teams of information technology (IT) professionals monitor, analyze and protect organizations from cyber-attacks. In the SOC, internet traffic, networks, desktops, servers, endpoint devices, databases, applications and other systems are continuously monitored for signs of a security incident. In operation, SOCs can reduce the impact of potential data breaches by helping organizations respond to intrusions quickly.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including receiving, from a plurality of sources, respective sets of incidents, and respective source-assigned suspiciousness labels for the incidents, applying a set of labeling rules so as to assign rule-based labels to respective incidents in a subset of the incidents in the received sets, comparing, in each of the incidents in the subset, the respective rule-based label to the respective source-assigned suspiciousness label so as to compute a respective label quality score for each of the sources, identifying the sources having respective label quality scores meeting a predefined criterion, fitting, by a processor, a model for computing predicted labels to the incidents received from the identified sources and the respective source-assigned suspiciousness labels of the incidents, applying the model to an additional incident received from one of the sources to compute a predicted label for the additional incident, and prioritizing a notification of the additional incident in response to the predicted label.

In one embodiment receiving a given set of incidents from a given source includes receiving a set of alerts from the given source and grouping the alerts into the given set of incidents.

In a first alert embodiment, the rule-based labels include rule-based incident labels, and wherein applying the labeling rules includes identifying a subset of the alerts from the given source having matching labeling rules, and applying the labeling rules to identified subset of alerts so as to generate respective rule-based alert labels for the alerts in the subset.

In a second alert embodiment, the rule-based alert labels have respective priorities, and wherein assigning a given rule-based incident label to a given incident includes identifying a highest of the priorities, and assigning the identified highest priority to the given rule-based incident label.

In a third alert embodiment, fitting the model includes computing an alert bitmask indicating the alerts in each of the incidents.

In another embodiment, the subset of the incidents includes the incidents having matching labeling rules.

In an additional embodiment, fitting the model includes computing one or more profile-based features for the incidents.

In a further embodiment, fitting the model includes computing one or more binned features for the incidents.

In a supplemental embodiment, fitting the model includes fitting respective models for the sources, and wherein fitting a given model for a given source includes analyzing the incidents received the sources other than the given source.

In one embodiment, the method further computing respective counts of incidents received from the sources, and wherein fitting the model includes analyzing the incidents received from the sources whose respective counts exceed a specified threshold.

In another embodiment, fitting the model includes fitting respective models for the sources, and wherein fitting a given model for a given source includes assigning a higher incident weight to the incidents received from the given source, and assigning a lower incident weight to the incidents received from the sources other than the given source.

In an additional embodiment, applying the model includes computing, using the model, a confidence score indicating maliciousness of the additional incident, computing an impact score indicating damage that can be caused by the additional incident, and wherein prioritizing the notification of the additional incident in response to the predicted label includes prioritizing the notification of the additional incident in response to the confidence score and the impact score.

In a first impact score embodiment, the additional incident includes a sequence of sub-incidents having respective stages in the sequence, and computing the impact score for each of the sub-incidents includes analyzing the respective stages of the sub-incidents.

In a second impact score embodiment, receiving the additional incident includes receiving a set of alerts, and grouping one or more of the alerts into the additional incident.

In a third impact score embodiment, computing the impact score includes analyzing the grouped one or more alerts.

In a fourth impact score embodiment, the grouped one or more alerts have respective alert types, and computing the impact score includes analyzing given alert type.

In a fifth impact score embodiment, the one of the sources includes one or more endpoints, and a given alert includes a given endpoint accessing a specified Uniform Resource Locator (URL).

In a sixth impact score embodiment the one of the sources includes one or more endpoints, and a given alert includes a given endpoint executing a command-line that matches a specified string.

In a seventh impact score embodiment, the method further includes computing a count of the grouped one or more alerts, and computing the impact score includes analyzing the computed count.

In an eighth impact score embodiment, the one of the sources includes one or more endpoints, and the method further includes computing a volume of data transmitted by the one or more endpoints during the additional given incident, wherein computing the impact score includes analyzing the computing volume of data.

In a ninth impact score embodiment, the one of the sources includes one or more endpoints, and the method further includes determining a number of files accessed or modified by the one or more endpoints during the additional given incident, wherein computing the impact score includes analyzing the determined number of files.

In a tenth impact score embodiment, the one of the sources includes one or more endpoints, and the method further includes determining one or more privileges of a user accessing a given endpoint during the additional given incident, wherein computing the impact score includes analyzing the determined one or more privileges.

In an eleventh impact score embodiment, the one of the sources includes one or more endpoints, and the method further includes determining a role of a given endpoint during the additional given incident, wherein computing the impact score includes analyzing the role.

There is also provided, in accordance with an embodiment of the present invention, an apparatus, including a memory configured to store a set of labeling rules, and at least one processor configured to receive, from a plurality of sources, respective sets of incidents, and respective source-assigned suspiciousness labels for the incidents, to apply a set of labeling rules so as to assign rule-based labels to respective incidents in a subset of the incidents in the received sets, to compare, in each of the incidents in the subset, the respective rule-based label to the respective source-assigned suspiciousness label so as to compute a respective label quality score for each of the sources, to identify the sources having respective label quality scores meeting a predefined criterion, to fit a model for computing predicted labels to the incidents received from the identified sources and the respective source-assigned suspiciousness labels of the incidents, to apply the model to an additional incident received from one of the sources to compute a predicted label for the additional incident, and to prioritize a notification of the additional incident in response to the predicted label.

There is additionally provided, in accordance with an embodiment of the present invention, a computer software product, the product includes a non-transitory computer-readable medium, in which program instructions are stored, which instructions, when read by a computer, cause the computer to receive, from a plurality of sources, respective sets of incidents, and respective source-assigned suspiciousness labels for the incidents, to apply a set of labeling rules so as to assign rule-based labels to respective incidents in a subset of the incidents in the received sets, to compare, in each of the incidents in the subset, the respective rule-based label to the respective source-assigned suspiciousness label so as to compute a respective label quality score for each of the sources, to identify the sources having respective label quality scores meeting a predefined criterion, to fit a model for computing predicted labels to the incidents received from the identified sources and the respective source-assigned suspiciousness labels of the incidents; to apply the model to an additional incident received from one of the sources to compute a predicted label for the additional incident, and to prioritize a notification of the additional incident in response to the predicted label.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
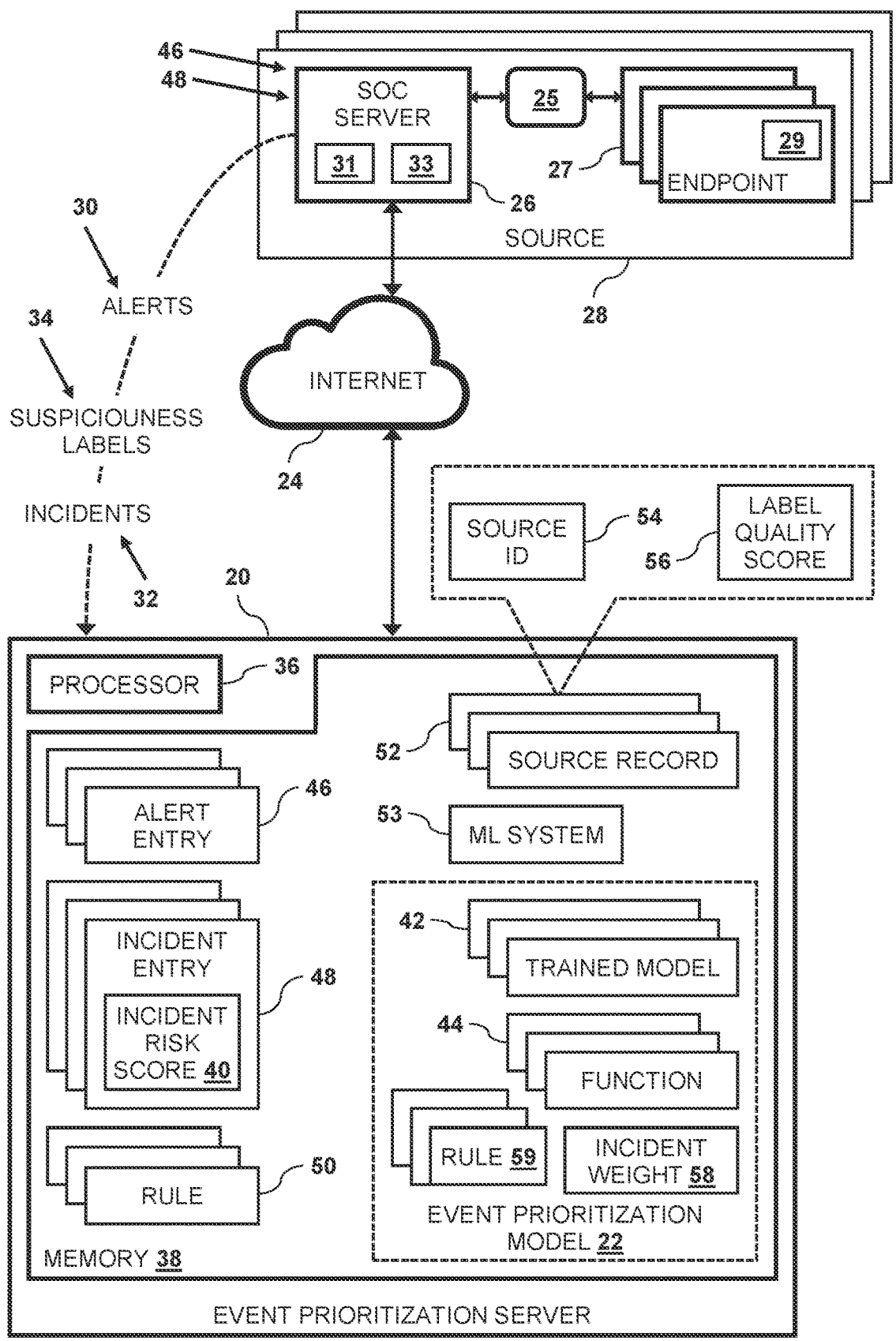
FIG. 1 is a block diagram that schematically shows a security server that is configured to generate and deploy an incident prioritization model, in accordance with an embodiment of the present invention.

Security operations centers (SOCs) can be flooded with huge daily volumes of cyber-security alerts that indicate a set of cyber-security incidents. In some instances, the number of incidents (e.g., 100) can exceed the SOC's handling capacity (e.g., 15). To expand this example, if the SOC employs 10 SOC analysts that can each handle 15 incidents per day (on average), and the SOC receives a daily average of 1,200 incidents, this number of daily incidents is too high for the SOC analysts to manually prioritize, let alone process.

Typically, SOC systems generate SOC rules based on previously prioritized use-cases that match a small subset of the alerts, which the SOC system uses to select which incidents are to be investigated. However, applying these SOC rules to real-world alerts can often result with the SOC system selecting false positives (i.e., incidents that are not malicious), while not selecting true positives (i.e., incident that are malicious).

Embodiments of the present invention provide methods and systems for prioritizing cyber-security incidents. Upon receiving, from a plurality of sources, respective sets of incidents, and respective source-assigned suspiciousness labels for the incidents, a set of labeling rules are applied so as to assign rule-based labels to respective incidents in a subset of the incidents in the received sets. In each of the incidents in the subset, the respective rule-based label is compared to the respective source-assigned suspiciousness label so as to compute a respective label quality score for each of the sources. Upon computing the respective label quality score for each of the sources, the sources having respective label quality scores meeting a predefined criterion are identified, and a processor fits a model for computing predicted labels to the incidents received from the identified sources and the respective source-assigned suspiciousness labels of the incidents. Finally, the model is applied to an additional incident received from one of the sources to compute a predicted label for the additional incident, and a notification of the additional incident is prioritized in response to the predicted label.

By using long term behavioral profiles that are observed (i.e., "learned") on each of the sources, systems implementing embodiments of the present invention can enrich alerts in the SOC with relevant information, and thereby efficiently prioritize the incidents for the SOC analysts so as to improve recall (i.e., the percentage of true positive cases covered), precision, response time, while at the same time reducing alert fatigue. Additional advantages of systems implementing embodiments of the present invention include:

Zero or minimal configuration.

Automatically adapting to each source (i.e., customer network).

An ability to learn each of the sources over time.

An ability to combine knowledge learned across customers.

Providing high accuracy in the selection of potentially malicious incidents.

An ability to handle third-party alerts.

System Description

FIG. 1 is a block diagram that schematically shows an example of a security server 20 that is configured to generate and deploy an incident prioritization model 22, in accordance with an embodiment of the present invention. In the configuration shown in FIG. 1, security server 20 is configured to communicate, via a public data network 24 such as the Internet, with a plurality of security operations center (SOC) servers 26 located at a plurality of sources 28.

In some embodiments, each source 28 comprises an organization (e.g., a company) that has a respective local data network 25 coupling a given SOC server 26 to a plurality of network endpoints 27 such as hosts (e.g., computer workstations, laptops and tablets), routers, firewalls and other network equipment. In these embodiments, each SOC server 26 on a given data network 25 can be configured to collect, from the endpoints on the given network, alerts 30 and incidents 32, and convey, via Internet 24, the collected alerts and incidents to security server 20.

In some embodiments, SOC server 26 comprises an SOC processor 31 and an SOC display (e.g., an L.E.D. monitor) 33, and can be configured to collect alerts 30 and incidents 32 from endpoints 27 by collecting raw logs (not shown) on endpoint agents 29 (e.g., Cortex XDR™ produced by Palo Alto Networks, Inc., of 3000 Tannery Way, Santa Clara, CA 95054 USA) that execute on the endpoints. In additional embodiments, the collected alerts and incidents may be anonymized.

A given alert 30 typically comprises a combination of one or more activities on a given host that have a potential to represent malicious or suspicious activity, and a given incident 32 typically comprises a group of one or more alerts 30 that are related to the same malicious activity in one or more of the hosts.

The following is an example of a given incident 32 comprising a set of alerts 30:

Living off the land (LOL) is a cybersecurity term used to explain the use of trusted, pre-installed system tools to conduct malicious activity. One LOL technique comprises LOLBins, which use Windows™ (produced by Microsoft Corporation, Redmond WA, USA) binaries to hide malicious activity. A given incident 32 may comprise a series of LOLBin alerts 30 that detected the following activity:

A Microsoft Office™ executable spawned a first LOLBin.

A second LOLBin established a connection to a rare external host.

Execution of a third LOLBIN that was renamed.

A fourth LOLBIN dropped a file to a storage device.

As indicated by these alerts (that were grouped together since they were all in the same process chain), this incident 32 comprises a user loading a malicious office document that comprised malicious code to rename a LOLBin file (e.g., powershell.exe) and then executing the renamed LOLBIN file with a command to connect to a malicious domain and download a next stage of malware.

Each given SOC server 26 can be configured to collect source-assigned suspiciousness labels 34 for a subset of the incidents collected by the given SOC server, and to convey, via Internet 24, the collected labels to security server 20. In one embodiment, SOC analysts can manually generate source-assigned suspiciousness labels 34 in response to examining alerts 30 and incidents 32. In another embodiment, a given endpoint can execute a software application that generates source-assigned suspiciousness labels 34 in response to examining alerts 30 and incidents 32.

Examples of source-assigned suspiciousness labels 34 include benign, malicious, or potentially unwanted activity (PUA). While PUAs are not malicious, they comprise activities not desired on a corporate network. For example, a BitTorrent™ client executing on a given endpoint 27 on a given network 25 can indicate that copyright protected material may be illegally downloaded to the given endpoint.

Security server 20 may comprise a server processor 36 and a memory 38. In embodiments described herein, security server 20 is configured to generate and deploy incident prioritization model 22 that is configured to compute incident risk scores 40 to prioritize handling of incidents 32, thereby enabling SOC analysts at sources 28 to efficiently handle the incidents. In the configuration shown in FIG. 1, memory 38 is configured to store:

Incident prioritization model 22 comprising a set of trained models 42, a set of functions 44, an incident weight 58 and source-defined rules 59, which are both described hereinbelow.

A set of alert entries 46 that have a one-to-one correspondence with alerts 30. Upon receiving a new alert 32 from a given SOC server 26, processor 36 is configured to generate a new alert entry 46, to extract information from the received alert, and to store the extracted information to the new alert entry. Alert entries 46 are described in the description referencing FIG. 2 hereinbelow.

A set of incident entries 48. In a first embodiment, upon processor 36 receiving a given incident 32, processor 36 can create a new corresponding incident entry 48, extract information from the received incident, and store the extracted information to the new incident entry.

In a second embodiment, processor 36 can analyze alert entries 46 so as to group the alerts corresponding to the alert entries into a set of incidents 32. Upon grouping one or more alerts 30 into a given incident 32, processor 36 can create a new corresponding incident entry 48, extract information from the given incident, and store the extracted information to the new incident entry.

Incident entries are described in the description referencing FIG. 3 hereinbelow.

In the configuration shown in FIG. 1, SOC servers 26 can store local instances of alert entries 46 and incident entries 48 to store information on additional alerts 30 and additional incidents 32, as described in the description referencing FIG. 5 hereinbelow.

A set of labeling rules 50. In embodiments described hereinbelow, processor 36 may receive, from SOC servers 26, source-assigned suspiciousness labels 34 for a subset of received alerts 30 and incidents 32, and apply labeling rules 50 to the received alerts and/or incidents so as to determine the quality of the source-assigned suspiciousness labels received from each source 28.

A set of source records 52 that have a one-to-one correspondence with sources 28. Each source record 52 comprises a source ID 54 that corresponds to a given source 28 and a label quality score 56. As described hereinbelow, processor 36 can compute a given label quality score 56 for a given source 28 by applying labeling rules 50 to the incidents and/or the alerts that the server processor receives from the given source. The given label quality score indicates the quality (i.e., accuracy) of source-assigned suspiciousness labels 34 received from the given source.

A machine learning (ML) system 53 that processor 36 can execute so as to train incident prioritization model 22, as described hereinbelow. For example, ML system 53 may comprise a system that uses a gradient boosted tree algorithm to train a prediction model such as incident prioritization model 22.

Processors 31 and 36 comprises a general-purpose central processing units (CPU) or special-purpose embedded processors, which are programmed in software or firmware to carry out the functions described herein. This software may be downloaded to security server 20 or SOC server(s) 26 in electronic form, over a network, for example. Additionally or alternatively, the software may be stored on tangible, non-transitory computer-readable media, such as optical, magnetic, or electronic memory media. Further additionally or alternatively, at least some of the functions of processors 31 and 36 may be carried out by hard-wired or programmable digital logic circuits.

Examples of memory 38 include dynamic random-access memories, non-volatile random-access memories, hard disk drives and solid-state disk drives.

In some embodiments, tasks described herein performed by server 20, SOC server 26 and endpoints 27 may be split among multiple physical and/or virtual computing devices. In other embodiments, these tasks may be performed in a data cloud.

Figure 2:
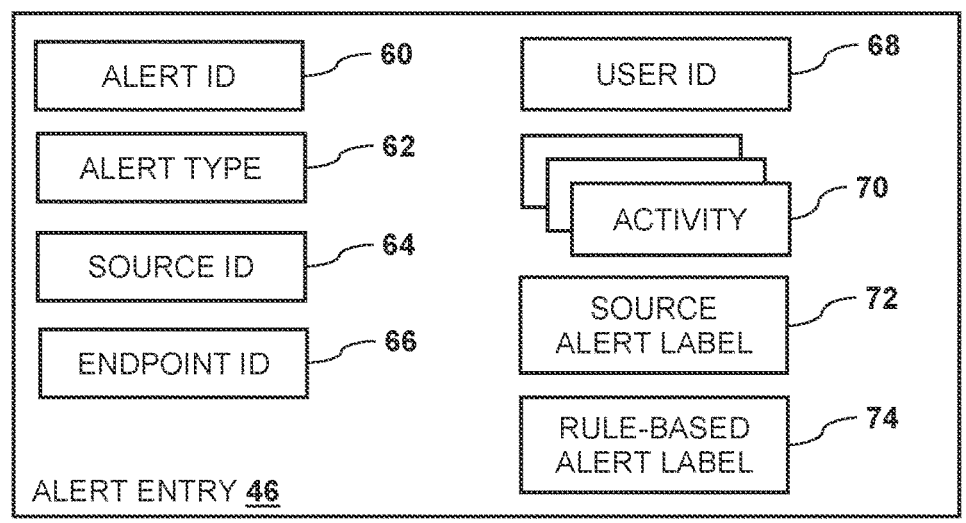
FIG. 2 is a block diagram showing an example of alert information stored on the security server, in accordance with an embodiment of the present invention.

FIG. 2 is a block diagram showing an example of data components stored in alert entries 46, in accordance with an embodiment of the present invention. Processor 36 can store the following information to each given alert entry 46 for a corresponding alert 30:

A unique alert ID 60.

An alert type 62 that describes the corresponding alert. In some embodiments, a given alert type can indicate a source for the corresponding alert. In these embodiments, examples of alert types 62 (i.e., sources) may include a firewall, an agent using first party predefined logic, a customer ID (e.g., source ID 64, as described hereinbelow), and a third-party vendor.

Source ID 64 can reference a given source 28 that generated the corresponding alert.

An endpoint ID 66 that references, on the data network of the organization referenced by source ID 64, a given endpoint 27 that caused or generated the corresponding alert. In some embodiments, the endpoint ID may comprise the media access control (MAC) address of the given endpoint.

A user ID 68 that references, on the data network of the organization referenced by source ID 64, a given user (not shown) accessing and operating the given endpoint that caused or generated the corresponding alert.

One or more activities 70 that describe one or more events that caused the corresponding alert and any other endpoints (i.e., on the data network of the organization referenced by source ID 64) that participated in the events. Examples of activities 70 are described in the series of LOLBins described supra.

A source alert label 72. If processor 36 receives a given source-assigned suspiciousness label 34 for the corresponding alert, then the server processor can store the received source-assigned suspiciousness label to source alert label 72.

A rule-based alert label 74. If processor 36 receives a given source-assigned suspiciousness label 34 (and store the received source-assigned suspiciousness label to source alert label 72) for the corresponding alert, then the server processor can apply one or more labeling rules 50 to the corresponding alert so as to compute rule-based alert label 74. As described hereinbelow, processor can compare source alert label 72 to rule-based alert label 74 to compute quality score 56 for the organization referenced by source ID 64. Similar to source-assigned suspiciousness labels 34, the possible verdicts that processor 36 can store to rule-based alert labels 74 (also referred to herein simply as rule-based labels 74 or training labels) can be, benign, malicious or potentially unwanted activity (PUA).

Figure 3:
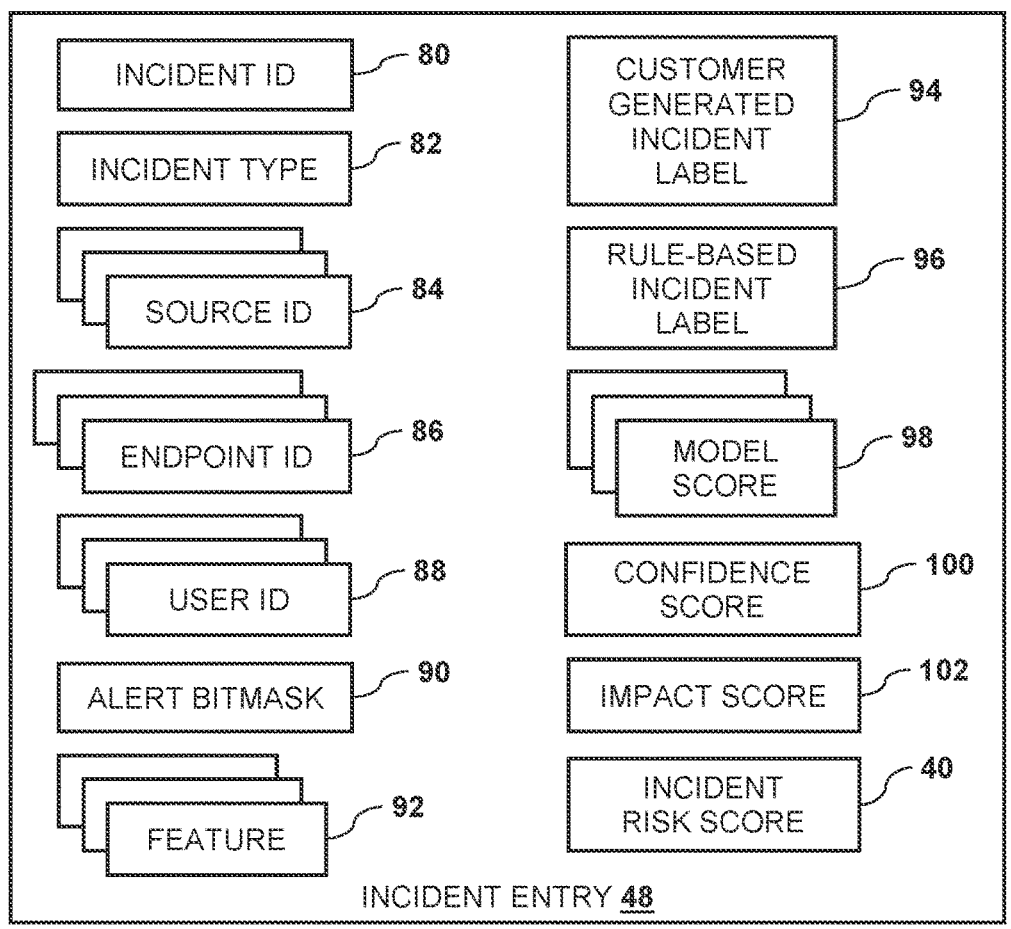
FIG. 3 is a block diagram showing an example of an incident information stored on the security server, in accordance with an embodiment of the present invention.

FIG. 3 is a block diagram showing an example of data components stored in incident entries 48, in accordance with an embodiment of the present invention. Processor 36 can store the following information to each given incident entry 48 for a corresponding incident 32:

A unique incident ID 80.

An incident type 82 that described the corresponding incident. Similar to alert types 62, the incident type for a given incident 32 can indicate a source for the given incident. For example, a given incident type 82 may comprise a firewall ID, an ID for an endpoint agent 29 using first party predefined logic, a customer ID (e.g., source ID 64, as described hereinbelow), or a third-party vendor ID.

One or more source ID 84s corresponding to the one or more sources 28 that generated the one or more alerts in the corresponding incident. For example, one or more endpoints 27 may (attempt to) contact the same command-and-control (C&C) server.

One or more endpoint IDs 86 that reference, on the data network of the organization referenced by source ID 64, one or more respective endpoints 27 that caused or generated the corresponding incident (or the one or more alerts in the corresponding incident). In some embodiments, the endpoint ID may comprise the media access control (MAC) address of the given endpoint.

One or more user IDs 88 that reference, on the data network of the organization referenced by source ID 64, one or more users (if applicable) operating the one or more endpoints that caused or generated the corresponding incident (or the one or more alerts in the corresponding incident).

An alert bitmask 90. In some embodiments, processor 36 can compute bitmask 90 comprising a set of bits (i.e., a bitmap) that correspond to a set (i.e., a universe) of alerts 30. In these embodiments upon creating the given entry, processor can initialize all the bits in alert bitmask 90 to "0", and the bits corresponding to the alerts in the corresponding incident to "1".

A set of features 92 that processor 36 can compute (or extract) features from the alerts in the corresponding incident.

A customer generated incident label 94. If processor 36 receives a given source-assigned suspiciousness label 34 for the corresponding incident, then the server processor can store the received source-assigned suspiciousness label to customer generated incident label 94.

A rule-based incident label 96. If processor 36 receives a given source-assigned suspiciousness label 34 (and store the received source-assigned suspiciousness label to customer generated incident label 94) for the corresponding incident, then the server processor can apply one or more labeling rules 50 to the corresponding incident so as to compute rule-based incident label 96. Similar to source-assigned suspiciousness labels 34, the possible verdicts that processor 36 can store to rule-based incident labels (also referred to herein as a rule-based labels 96) 96 can be, benign, malicious or potentially unwanted activity (PUA). Computing rule-based incident labels 96 is described in the description referencing step 120 in FIG. 4 hereinbelow.

Additionally, as described hereinbelow, processor 36 can compare customer generated incident label 94 to rule-based incident label 96 to compute quality score 56 for the organization referenced by source ID 64. In further embodiments, processor 36 can also use rule-based incident labels 96 to train event prioritization model 22.

A set of model scores 98 comprising respective scores generated by trained models 42. In embodiments herein, upon applying a given model 42 to a given incident, the given model generates a given model score (i.e., a predicted label) indicating a suspected maliciousness of the given incident. Details of models 42 are described hereinbelow.

A confidence score 100 between "0" and "1" that represents the likelihood of the corresponding incident being malicious. Details of confidence scores 102 are described hereinbelow.

An impact score 102 between "0" and "1" that represents the potential damage the corresponding incident can pose (i.e., to the organization referenced by source ID 84) if it is malicious. In some embodiments, the computation of impact score 102 can vary for different user IDs 88 (e.g., the user ID for a CEO, a manager or an analyst), different incident types 82, different resource types (e.g., databases, domain controllers, production servers and Jenkins servers), or different branches (i.e., company sites). Details of impact scores 102 are described hereinbelow.

Incident risk score 40 comprising combination of confidence score 100 and impact score 102. Details of risk scores 40 are described hereinbelow.

An incident weight 104 which, as described hereinbelow, comprises a parameter for ML system 53.

In embodiments described herein scores 40, 98, 100 and 102 have respective ranges between zero (i.e., less suspicious/malicious) and one (i.e., more suspicious/malicious).

As described in the description referencing FIG. 2 hereinabove, incident prioritization model 22 comprises a set of functions 44. In embodiments described hereinbelow, processor 36 can use functions 44 to compute confidence score, 102, impact score 104 and incident risk score 40 so as to determine incident risk score 40.

Data Cleaning and Labeling

As described in the description referencing FIG. 1 hereinabove, source-assigned suspiciousness labels 34 typically originate from a plurality of different sources 28. In some instances, the quality of labels can vary between the different sources. For example, a given source 28 may label many incidents 32 as malicious when in fact they comprise PUAs. Embodiments described hereinbelow describe computing label quality scores that enable labels 72 and 94 from less reliable (i.e., from a labeling perspective) to be filtered out when training event prioritization model 22. For example, 50 out of 200 sources 28 may have low-quality labeling. In embodiments herein training event prioritization model 22 comprises training one or more models 42.

In embodiments of the present invention, processor 36 can compute label quality score 56 for a given source 28 by applying labeling rules 50 to alerts 30 and/or incidents 32 collected from the given source so as to generate rule-based alert labels 74 for the alerts and/or rule-based incident labels the incidents. Processor 36 can then compare the generated rule-based labels 74 and/or 96 to source-assigned suspiciousness labels 34 received from the given source for the alerts and/or the incidents. Since labeling rules 50 are typically defined for a subset (e.g., 20 out of 150 possible alerts) of alerts 30 and/or incidents 32, processor 36 can ignore, when computing the label quality score, any alerts 30 and incidents 32 that do not have corresponding labeling rules 50.

In some embodiments, one or more SOC analysts can create the set of labeling rules 50 that automatically label specific incidents 32 and/or alerts 30 with a verdict with high accuracy (e.g., 85%, 90% or 95%). Similar to source-assigned suspiciousness labels 34, the possible verdicts (i.e., that processor 36 can assign to incidents 32 and/or alerts 30) for each labeling rule 50 can be, benign, malicious or potentially unwanted activity (PUA). Note that some of alerts 30 and/or incidents 32 might not have a deterministic verdict. In these instances, some sources 28 may consider a "PUA" verdict as malicious, while other sources 28 may consider them as "benign".

Examples for labeling rules 50 include, but are not limited to:

If processor 36 detects that a specific process file hash is found in a third-party list of malicious hashes, then the server processor can mark the incident as "malicious".

If processor 36 detects that a given alert 30 comprises a unique process command line attributed to known malicious/malware activity, then the server processor can (a) mark the given alert considered as "malicious", and (b) mark an entire incident 32 (i.e., that comprises the given alert and that may comprise one or more additional alerts 30) as "malicious".

If software known to conduct benign activity creates an alert, then processor 36 can mark the alert as "benign".

In some embodiments, processor 36 can compute the following label attributes that the server processor can use to compute the label quality score for a given source 28 as:

Number_of_samples: A number of alerts 30 and incidents 32 received from a given source 28.

Number_of_labeled_samples: A number of source-assigned suspiciousness labels 34 received from the given source (i.e., for the received alerts and incidents).

Labels_percentage: A percentage of the alerts and the incidents received from the given source for which there were corresponding source-assigned suspiciousness labels also received from the given source.

Number_of_incidents_labeled_as_malicious: A count of the incidents received from the given source whose corresponding source-assigned suspiciousness labels were "suspicious".

Number_of_incidents_labeled_as_benign: A count of the incidents received from the given source whose corresponding source-assigned suspiciousness labels were "benign".

Precision: A precision metric such as, for a given source 28, a number of malicious (i.e., as determined by labeling rules 50) source-assigned suspiciousness labels 34 divided by the total number of the source-assigned suspiciousness labels.

Number_of_hosts: A number of hosts at the given source.

Number_of_days: A number of days in which the given source-assigned suspiciousness labels 34 (e.g., (the date of the last labeled alert 30 or incident 32)—(the date of the last labeled alert 30 or incident 32)).

Distinct_number_of_days: A distinct number of days in which the given source generated any source-assigned suspiciousness labels 34.

Days_ratio: Distinct_number_of_days/Number_of_days.

Agreement/disagreement with labeling rules 50. This can be expressed as respective numbers of cases for the given source where:

agree_tp: A number of instances where source-assigned suspiciousness labels 34 and their corresponding rule-based labels 74 or 96 (i.e., for alerts 30 and incidents 32) were both "malicious".

agree_fp: A number of instances where source-assigned suspiciousness labels 34 and their corresponding rule-based labels 74 or 96 (i.e., for alerts 30 and incidents 32) were both "benign".

flip_benign_to_malicious: A number of instances where, for alerts 30 and incidents 32, the respective source-assigned suspiciousness labels 34 were "benign" and their corresponding rule-based labels 74 or 96 were "malicious".

flip_malicious_to_benign: A number of instances where, for alerts 30 and incidents 32, the respective source-assigned suspiciousness labels 34 were "malicious" and their corresponding rule-based labels 74 or 96 were "benign".

In some embodiments, when computing label quality scores 56, processor 36 can ignore any alerts 30 and incidents 32 whose corresponding rule-based alert labels 74 or 96 are "PUA".

Upon computing the label attributes for each source 28, processor 36 can use the following formula to compute respective label quality scores 56 for sources 28:

```
customer_labels_quality_score =
function (
  Number_of_samples, Number_of_labeled_samples,
  Labels_percentage,
  Number_of_incidents_labeled_as_malicious,
  Number_of_incidents_labeled_as_benign,
  Precision, Number_of_hosts, Number_of_days,
  Distinct_number_of_days, Days_ratio,
  agree_tp, flip_malicious_to_benign,
  agree_fp, flip_benign_to_malicious)
```

An example of the function in this formula may comprise:

```
if      (flip_malicious_to_benign>5) AND
        (flip_benign_to_malicious>5) AND
        ((agree_tp+agree_fp) <20)
then    return 0
else    return 1
```

Incident Prioritization Model Definition

To train event prioritization model 22, processor 36 can select incidents 32, and extract information from the selected incidents. As described hereinbelow, processor 36 can group alerts 30 into the incidents that the server processor can use to train event prioritization model 22.

In some embodiments, processor 36 can select sources 28 having label quality scores 56 that meet a redefined criterion (e.g., exceed a specified threshold), and extract, from the incidents from the selected sources, the information to train event prioritization model 22. For example, if the label quality scores range between zero (not suspicious) and one (very suspicious), processor 36 can select the sources whose respective label quality scores 56 exceed 0.5.

In embodiments described herein, processor 36 can fit event prioritization model 22 by fitting one or more models 42 for computing incident risk scores 104 (also referred to herein as predicted labels) to the incidents and/or incidents received specific sources 28 and the respective source-assigned suspiciousness labels 34. Fitting a given model 42 may also be referred to herein as training the given model, and Information that processor 36 can use to train event prioritization model 22 (i.e., models 42) is described hereinbelow.

In embodiments described herein, models 42 may comprise:

Global models 42. In some embodiments, processor 36 can train a separate respective global model 42 for each source 28. As described hereinbelow, a given feature 92 may comprise source ID 64. For each given global model 42 for a given source 28, processor 36 can train the given model by analyzing information extracted from incidents 32 and/or alerts 30 that the server processor received from sources 28 other than the given source.

Global customer model 42. In some embodiments, processor 36 can train global customer model 42 by first analyzing information extracted from all incidents 32 from all sources 28. In these embodiments, processor 36 can compute respective counts of the source-assigned suspiciousness labels received from each of the sources, select sources 28 whose respective counts exceed a specified threshold (e.g., 100, 200, 300, 400, 500), and then continue training global customer model 42 by analyzing information extracted from the selected sources (i.e., the sources whose respective counts exceed the specified threshold) so as to train global customer model 42.

In additional embodiments, processor 36 can train global customer model 42 by analyzing all the data (i.e., from the alerts and the incidents) so as to capture phenomena that are only relevant to specific sources 28, and not to the entire population of the sources. To implement this customization, processor 36 can add source ID 64 as a given feature 92 when training global customer model 42.

For example, a specific combination of alerts 30 may be common and legitimate for a specific source 28, but is suspicious for the remaining sources 28 (maybe they have a tool that triggers this alert combination). In this in that case, if source_id='1234' then global customer model 42 can "learn" something like:

```
if source_id != '1234'
then:
    alert_combination_score=0.8
else:
    alert_combination_score=0.2
```

On the other hand, if global customer model 42 does not use source ID 64 as a given feature, then the global customer model must handle all the cases the same way. Therefore, global customer model 42 may "learn" the average across the sources. For example:

alert_combination_score=0.72 where the computed average of 0.72 was lowered (i.e., from 0.8) due to customer '1234'.

Customer specific models 42. In some embodiments, processor 36 can train a respective separate global model 42 for each source 28. To train a given customer specific model 42 for a given source 28, processor 36 can first analyze information extracted from all incidents 32 (and their corresponding alerts 30) from all sources 28 except source IDs 64. Processor 36 can then continue training the given customer specific model by applying a greater weight to the information extracted from the incidents from the given source. In some embodiments, the weight applied to incidents 32 (and their corresponding alerts 30) from the given source can be computed using the following formula:

Weight=(Number of incidents 32 received from the given source)/(Total number of incidents 32 from all sources 28)

The computed Weight typically comprises higher values when the denominator (i.e., in the equation presented hereinabove) is lower. For example, Weight may comprise values such as 50, 100, 500, 1000 and 5000. In some embodiments, the weight applied to incidents 32 (and their corresponding alerts 30) from other sources 28 (i.e., not the given source) may simply comprise "1".

Information that processor 36 can extract from (or compute for) each selected incident 32 includes:
Incident ID 80.
Source ID 84.
Customer generated incident label 94.
Alert bitmask 90.
Features 92. In embodiments described herein features 92 may comprise either profile-base features 92 and binned features 92, which are both described hereinbelow.
Incident weight 58, which comprises one or more parameters for ML system 53. For example, incident weight 58 may comprise:
  "1" for global models 42 (i.e., all incidents 32 are equal).
  "1000/(number of incidents 32 from each given source 28)" for global customer models 42.
  For a given customer specific model 42 for a given source 28: "100" if (source 28=the given source), else "1".

As described supra, features 92 may comprise profile-based features 92 and binned features 92. In some embodiments, processor 36 can compute a profile across all sources 28 or for a specific customer 28, and use the computed profiles as a given feature 92. Examples of profile-based features 92 include:

feature_group_distinct_alert_names: This feature comprises a count (i.e., processor 36 or a given processor 31 can compute the count) of the distinct alerts 30 collected by server 20.
feature_number_of_total_bioc_alerts: This feature comprises a count (i.e., processor 36 or a given processor 31 can compute the count) of the distinct behavioral-based indicators of compromise (BIOC) type alerts (including informational and low severity alerts) that were created by the research teams in Palo Alto Networks or by customers, which participated as part of the XDR™ alerts group.
feature_number_of_traps_alerts: This feature comprises a count (i.e., processor 36 or a given processor 31 can compute the count) of the distinct agent alerts (i.e., alerts from endpoint agents 29 that can include informational and low severity alerts) which participated as part of the XDR™ alerts group.
feature_is_installer_commandline_no_guid: This feature comprises a binary value (i.e., 0 or 1, computed by processor 36 or a given processor 31) that indicates whether or not a normalized command-line that is part of the alerts in the group contains indication for an installer (which usually means it is a false positive alert).
feature_is_attack_simulation: This feature comprises a binary value (i.e., 0 or 1, computed by processor 36 or a given processor 31) that indicates whether or not a normalized command-line that is part of the alerts in the group contains indication for a penetration testing tool (which usually means it is a true positive alert).
feature_group_has_prevention: This feature comprises a binary value (i.e., 0 or 1, computed by processor 36 or a given processor 31) that indicates whether or not a given alert 30 that is part of a given incident 32 and when triggered, caused a preventative action in the endpoint that generated the given alert.

In machine learning, features having high cardinalities (i.e., large number of distinct values) can cause trouble during a training phase, because the machine learning algorithm may learn very specific patterns in the data which may be incorrect or noisy. For example, the algorithm can learn that if a combination of alerts 30 was seen on more endpoints 27 then the combination is less suspicious, except for cases where it was seen on 45-47 endpoints 27, in which case it is highly suspicious (this is obviously a random phenomenon and not a general rule).

A common method for accommodating these types of features in machine learning is discretization, which can be used to prevent ML system 53 from overfitting models 42. An example of discretization comprises mapping values to a "t-shirt size" using a predefined threshold list. For example, for the feature 'feature_combination_number_of_group_ids_seen', and thresholds [10, 20, 100, 999999] (i.e., [bin #1, bin #2, bin #3, bin #4]:
  If the feature value is 5, then the "shirt size"/bin will be 0 (i.e., no bin).
  If the value is 22 then the bin will be 2 (i.e., between 20 and 100 is bin #2).

To implement discretization, embodiments of the present invention can use binned features 92 that comprise features indicating how many endpoints 27 had the same alert 30. When computing a given binned feature 92, the result can be binned values instead of getting a specific number (e.g., how many endpoints 27 had the same alert 30). For example, if the bins comprise 1-3, 4-9 and 10+, then:

If two endpoints had the same given alert 30, then processor 36 can increase the "1-3" binned value by 1.

If four endpoints had the same given alert 30, then processor 36 can increase the "4-9" binned value by 1.

If 11 endpoints had the same given alert 30, then processor 36 can increase the "10+" binned value by 1.

Examples of binned features 92 processor 36 can use to create models 42 include:

feature_combination_number_of_group_ids_see: For a given incident 32, this binned feature 92 counts the distinct number of incidents 32 that comprises the same alerts 30 as the alerts in the given incident.

feature_combination_number_of_agent_ids_seen: For a given incident 32, this binned feature counts a number of distinct endpoint agents 29 that detected the same alerts 30 as the alerts in the given incident.

feature_combination_cmds_number_of_group_ids_seen: For a given incident 32, this binned feature 92 counts the distinct number of incidents 32 having identical combination of alerts 30 and processes command line combination to those in the given incident.

feature_median_alert_group_ids_seen: For a given incident 32 comprising a given alert 30, this binned feature 92 counts, per source 28, a number of incidents 32 comprising the given alert, and then computes a median value of that count between all sources 28.

feature_median_alert_agent_ids_seen: For a given incident 32 comprising a given alert 30, this binned feature 92 counts, per source 28, a number of agent IDs 29 that generated the given alert, and then computes a median value of that count between all sources 28.

In addition to profile-based features 92 and binned features 92, processor 36 can also compute, for each given incident 32 comprising a set of alerts 30 received from a given source 28, additional features 92 such as:

A count of alerts 30 received from each source 28 and/or from each endpoint 27.

A count of each distinct alert type 62 received from each source 28 and/or from each endpoint 27.

A count of MITRE ATT&CK™ tactics in the given incident. In some embodiments, many alerts have a tag indicating the MITRE tactic/s associated with it Roles of the endpoints 27 involved in the given incident. The roles can either be learned or can be specified by a user. Examples of roles include, but are not limited to a domain controller, an IT laptop, a printer, an R&D system, a sales system and a server.

Information from the alert entries corresponding to the set of alerts. As described supra, this information may comprise alert IDs 60, alert types 62, source IDs 64, user IDs 68, activities 70, source alert labels 72 and rule-based alert label 74.

Upon computing features 92, processor 36 can input, to machine learning system 53, the computed features and information from alert entries 46 and incident entries 48 so as to generate global models 42, global customer models 42 and customer specific models 42.

Incident Prioritization Model Generation and Deployment

Figure 4:
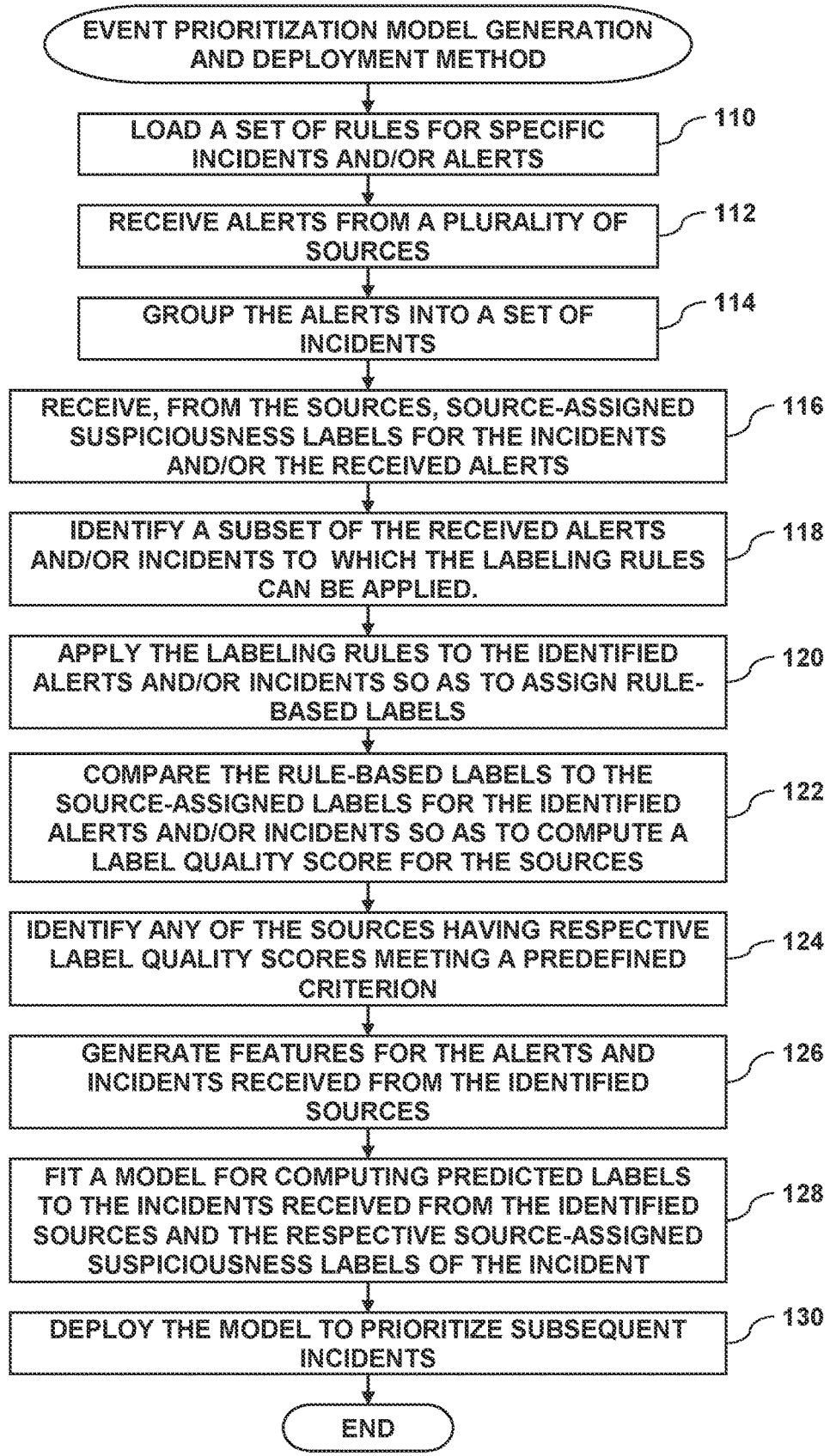
FIG. 4 is a flow diagram that schematically illustrates a method of generating and deploying the incident prioritization model, in accordance with an embodiment of the present invention.

FIG. 4 is a flow diagram that schematically illustrates a method of generating and deploying incident prioritization model 22, in accordance with an embodiment of the present invention.

In step 110, processor 36 loads a set of labeling rules 50. As described supra, labeling rules 50 can be defined by one or more SOC analysts.

In step 112, processor 36 receives, from the SOC servers at the plurality of sources 28, respective sets of alerts 30 and/or incidents 32, wherein each of the sets comprises alerts 30 and/or incidents 32 from a given source 28. In some embodiments, endpoints 27 generated the received alerts within a specific timespan (e.g., 7, 14, 21 or 28 days).

In step 114, processor 36 groups the received alerts into a set of incidents 32 (i.e., that include the received incidents). In one example, processor 36 can group alerts 30 with identical parent process IDs into a single incident 32. In another example, processor 36 can group all alert 30 having identical destination domains into a single incident 32.

In step 116, processor 36 receives, from sources 28, respective source-assigned suspiciousness labels 34 for the received incidents. In some embodiments, processor 36 can receive the respective source-assigned suspiciousness labels for a given received incident 32 by receiving source-assigned suspiciousness labels 34 for the alerts in the given incident.

In step 118, processor 36 identifies a subset of the received alerts and/or incidents to which labeling rules 50 can be applied. In other words, processor 36 identifies any of the received alerts and/or incidents that have matching labeling rules 50. As described supra, labeling rules 50 can be defined for a specific set of alerts 30 and/or incidents 32, and processor 36 may receive, from sources 28, alerts 30 and/or incidents 32 that are not in the specific set.

As described supra, a given incident 32 may comprise a series of LOLBin alerts 30. Therefore, a given labeling rule 50 for a given alert 30 may comprise assigning, upon detecting execution of a renamed LOLBin (i.e., on a given endpoint 27), a respective rule-based alert label 74 (e.g., PUA or malicious) to the given alert. Likewise, a given labeling rule 50 for a given incident may comprise assigning, upon detecting a specific sequence of LOLBin alerts (e.g., the LOL example described supra) in a process chain (i.e., executing on a given endpoint 27), a respective rule-based incident label 96 (e.g., PUA or malicious) to the given incident.

In step 120, processor 36 applies labeling rules 50 to the alerts and/or incidents in the identified subset so as to assign respective rule-base alert labels 74 and rule-based incident labels 96 to the identified alerts and/or incidents.

As described supra, processor 36 can assign, to alerts 30, rule-base alert labels 74 (i.e., verdicts) such as malicious, PUA and benign to rule-based incident labels 96, and then determine, for incidents 32, rule-based incident labels 96 by analyzing the respective rule-based alert labels of the alerts in the respective incidents.

As described supra, processor 36 can assign verdicts such as benign, PUA and malicious to rule-base alert labels 74. In some embodiments, processor 36 can assign priorities to each of the possible verdicts. For example, processor 36 can assign "0" (i.e., a low priority) to benign, assign "1" (i.e., a medium priority) to PUA, and "3" (i.e., a high priority) to malicious.

In these embodiments, processor 36 can identify and assign, to a given rule-based incident label 96 for a given incident 32, the highest priority rule-base alert label 74 for the alerts in the given incident as follows:

If all the verdicts of the rule-base alert labels of the alerts in the given incident are benign, then processor 36 can assign a benign verdict to the rule-based incident label for the given incident.

If the verdicts of the rule-base alert labels for the alerts in the given incident are either benign or PUA (i.e., no malicious verdicts), then processor 36 can assign a PUA verdict to the rule-based incident label for the given incident.

If any of the verdicts of the rule-base alert labels of the alerts in the given incident is malicious, then processor 36 can assign a malicious verdict to the rule-based incident label for the given incident.

In step 122, processor 36 compares, for each of the incidents in the identified subset, the respective generated rule-based incident label to the respective received source-assigned suspiciousness label (i.e., stored in a given customer generated incident label 94) so as to compute a respective label quality score 56 for each source 28. In some embodiments (i.e., if available), processor 36 may additionally (or alternatively) compute one or more label quality score 56, by comparing, for each of the alerts in the identified subset, the respective generated rule-based alert label to the respective received source-assigned suspiciousness label (i.e., stored in a given source alert label 72) so as to compute a respective label quality score 56 for each source 28.

In step 124, processor 36 identifies (any of) the sources having respective label quality scores 56 meeting a predefined criterion. In a first embodiment, a given source 28 having higher label quality score 56 may indicate a higher quality of the source-assigned suspiciousness labels the processor 36 received from the given source, and the predefined criterion may comprise a minimum threshold for the label quality score 56. For example, label quality scores 56 can have a range between zero and one, and processor 36 can select the sources whose respective label quality score 56 are greater than 0.5. This ensures that information used to train event prioritization model 22 is extracted from incidents 32 comprising alerts received from sources 28 that have reliable labeling.

In a second embodiment, a given source 28 having lower label quality score 56 may indicate a higher quality of the source-assigned suspiciousness labels the processor 36 received from a given source, and the predefined criterion may comprise a maximum threshold for the label quality score 56. In a third embodiment, the label-quality score may simply generate quality-labels (e.g., "poor", "fair", "good", "excellent") that indicate the quality of the source-assigned suspiciousness labels the processor 36 received from a given source, and the predefined criterion may comprise specific quality-labels (e.g., "good" and "excellent"). In addition to these three embodiments, any predefined or dynamic criterion that processor 36 can use to identify sources 28 having higher qualities of source-assigned suspiciousness labels is considered to be within the spirit and scope of the present invention.

In step 126, processor 36 generates/extracts features 92 from incidents 32 received from the sources identified in step 124. Features 92 are described hereinabove.

In step 128, processor 36 uses machine learning system 53 executing on the server processor to fit event prioritization model 22 (i.e., one or more models 42) for computing predicted labels to the incidents (i.e., the features that the server processor generated from alerts) and/or incidents received from the identified sources and the respective source-assigned suspiciousness labels 34 (i.e., stored in customer generated incident labels 94). As described supra, models 42 comprise global models 42, global customer models 42 and customer specific models 42. As described in the description referencing FIG. 5 hereinbelow, processors 31 can be configured to generate respective incident risk scores 104 for incidents 32. In embodiments herein, incident risk scores 104 are also referred to as the predicted labels.

In one embodiment, fitting event prioritization model 22 may comprise computing alert bitmask 90 and features 92. In another embodiment, fitting event prioritization model 22 may comprise training global models 42, global customer models 42 and customer specific models 42, as described hereinbelow. In an additional embodiment, fitting event prioritization model 22 may comprise computing profile-based features 92 and/or binned features 92.

Finally, in step 130, processor 36 deploys incident prioritization model 22 (comprising trained models 42, functions 44, incident weights 58 and source-defined rules 59) to SOC servers 26 at sources 28, and the method ends. As described in the description referencing FIG. 4 hereinbelow SOC servers 26 can use incident prioritization model 22 to prioritize additional incidents 32 detected by their respective endpoint agents 29.

Figure 5:
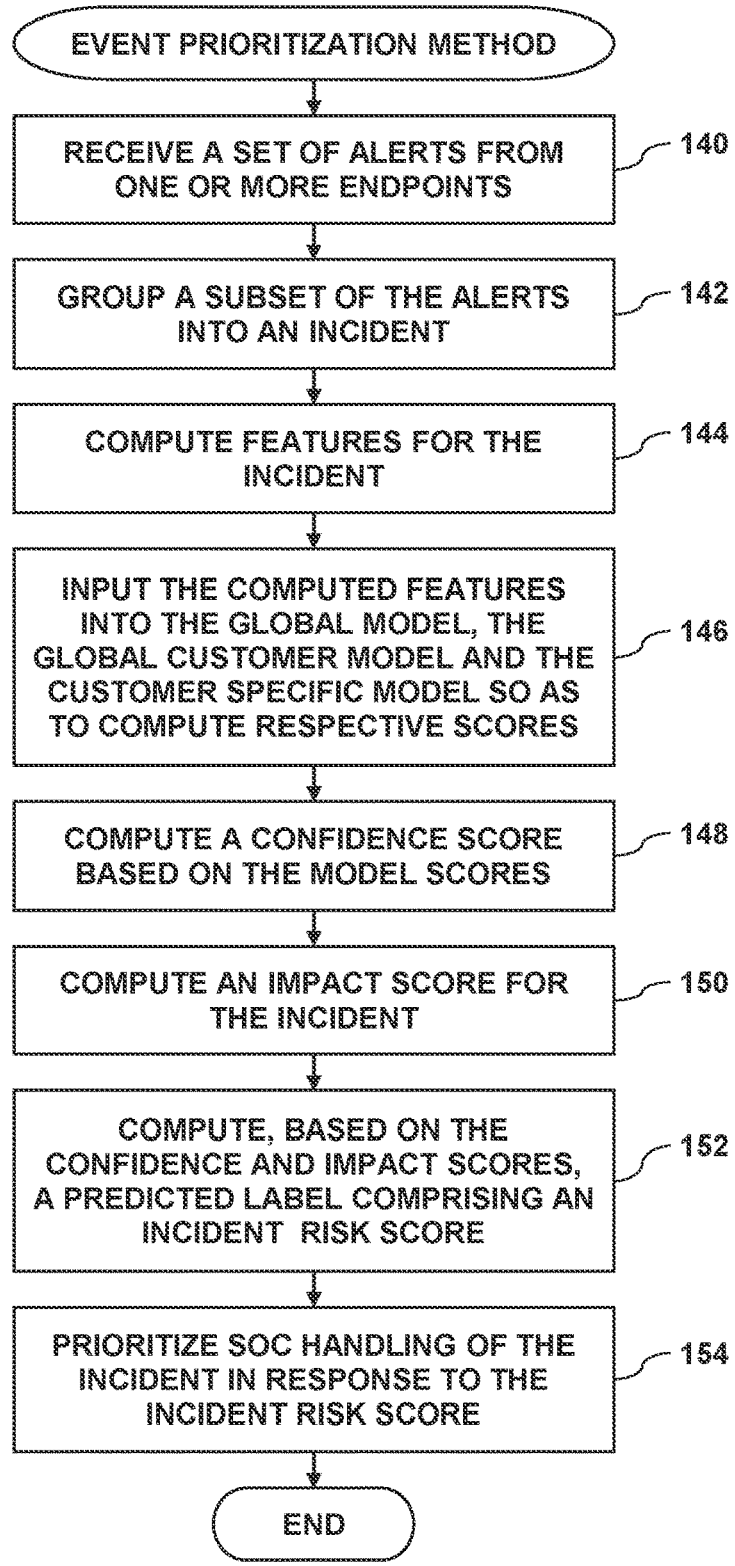
FIG. 5 is a flow diagram that schematically illustrates a method of using the incident prioritization model to prioritize handling of incident notifications, in accordance with an embodiment of the present invention.

FIG. 5 is a flow diagram that schematically illustrates a method of using incident prioritization model 22 to prioritize additional incidents 32, in accordance with an embodiment of the present invention.

In step 140, a given SOC processor 31 in a given SOC server 26 at a given source 428 receives a set of additional alerts 30 from endpoint agents 29 deployed on endpoints 27 at the given source.

In step 142, using embodiments described supra, the given SOC processor in the given SOC server groups one or more (i.e., a subset) of the additional alerts into an additional incident 32. In some embodiments, the given SOC processor in the given SOC server can group the additional alerts into a set of additional incidents 32, and the additional incident (i.e., in step 142) comprises one of the additional incidents in the set.

In step 144, the given SOC processor in the SOC server computes/extracts, using embodiments described supra, features 92 for the additional incident.

In step 146, the given SOC processor in the given SOC server applies model 22 to the additional incident so as to compute a predicted label for the additional incident. In embodiments described herein, the predicted label comprises incident risk score 40. In some embodiments, the given SOC processor can apply model 22 to the additional incident by conveying (i.e., inputting) the computed features into the global model, the global customer model and the customer specific model so as to compute respective model scores 98. In other embodiments, the given SOC processor can apply model 22 to the additional incident by computing, as described hereinbelow, one or more scores such as confidence score 100, impact score 102 and incident risk score 40.

In step 148, the given SOC processor in the given SOC server computes, using a first given function 44, the confidence score for the additional incident. The first given function configured to compute confidence scores 100 may also be referred to herein simply as confidence score function 44.

In some embodiments, confidence score function 44 may comprise:

> Function (Global_model_score,
> Global_customer_model_score,
> Customer specific_model_score)

In a first embodiment, confidence score function 44 can identify a highest (i.e., max( )) of the three model scores. In a second embodiment, confidence score function 44 can compute a mean of the three model scores. In a third embodiment, confidence score function 44 may comprise a computation such as:

(alpha*global_model_score)+
(beta*global_customer_model_score)+
(gamma*gustomer_specific_model_score)

where alpha, beta and gamma comprise values between zero and one.

In step 150, the given SOC processor in the given SOC server computes, using a second given function 44, the impact score for the additional incident. The impact score for the additional incident indicates "possible damage" that the additional incident can cause if the additional incident is indeed malicious. As described hereinbelow, the given SOC processor can compute impact score 102 for the additional incident by comprises analyzing the grouped alerts (i.e., described in the description referencing step 142 hereinabove) in the additional incident.

The second given function configured to compute impact scores 102 may also be referred to herein simply as impact score function 44. In some embodiments, impact score function 44 can be custom defined by sources 28.

In a first impact score embodiment, the given SOC processor can execute impact score function 44 so as to compute impact score 102 by assigning (i.e., on a per-source 28 basis) higher priorities to "featured assets" such as specific alerts 30 and alerts associated with specific subnets, endpoints 27 or users. For example, the given SOC processor can compute impact score 102 so as to have a higher score (i.e., value) if the additional incident involves a given endpoint 27 comprising a production server, a given endpoint 27 comprising a C-level executive workstation or a given user ID 88 that has access privileges to financial information.

In a second impact score embodiment, the given SOC processor can execute impact score function 44 so as to compute impact score 102 by applying source-defined (i.e., defined by the customer(s)) rules 59 within a given incident 30. Examples of source-defined rules 59 include:
Assigning a higher value to the given impact score if a given alert 30 in the additional incident comprises a specified alert type 62.
Assigning a higher value to the given impact score if a given alert 30 in the additional incident indicates that a given endpoint 27 accessed a specified Uniform Resource Locator (URL) on Internet 24.
Assigning a higher value to the given impact score if a given alert 30 in the additional incident indicates that a given endpoint 27 executed a command-line that matches a specified (text) string.
Assigning a lower value to the given impact score if the additional incident comprises a given alert triggered by a specific endpoint 27 (e.g., a security testing workstation).

In a third impact score embodiment, an SOC analyst at the given source 28 can flag one or more alert types 62 as being more critical. In this embodiment, the given SOC processor can execute impact score function 44 so as to compute impact score 102 by analyzing the alert types. For example, the given SOC processor can execute impact score function 44 so as to compute impact score 102 by assigning a higher value to the given impact score if any of the alert types in the alerts in the additional entry match any of the flagged alert.

In a fourth impact score embodiment, an SOC analyst can, based on previously performed research (e.g., by an SOC analyst), identify score attributes e.g., information stored in the corresponding alert entries 46 and/or incident entry 48) in incidents 30, determine respective impacts of the score attributes, and adjust the given impact score accordingly.

In a first example for the fourth impact score embodiment, a given score attribute comprises a count, in the additional incident, of additional alerts 30 that a given endpoint 28 generated after the endpoint agent on the given endpoint executed a preventive action (i.e., "after prevention"). This may indicate that an attacker tried multiple approaches until the attacker successfully performed an attack. In this example, the given SOC processor can execute impact score function 44 so as to adjust the impact score as follows:
If there are 0-1 additional alerts 30 then do not change the impact score.
If there are 2-9 additional alerts 30 then add 0.2 to the impact score.
If there are 10 or more additional alerts 30 then add 0.3 to the impact score.

In some embodiments the additional incident 32 may indicate a cyberattack comprising a sequence of "sub-incidents" such as:
1. A reconnaissance attack where an adversary is trying to gather information that they can use to plan future operations. Reconnaissance attacks typically involve adversaries actively or passively gathering information that can be used to support targeting. Such information may include details of the victim organization, infrastructure, or key directories such as "staff/personnel". This information can be leveraged by the adversary to aid in other phases of the adversary lifecycle, such as using gathered information to plan and execute initial access, to scope and prioritize post-compromise objectives, or to drive and lead further reconnaissance efforts.
2. A privilege escalation attack where an adversary is trying to gain higher-level permissions. Privilege escalation attacks comprise techniques adversaries use to gain higher-level permissions on a system or network. Adversaries can often enter and explore a network with unprivileged access but require elevated permissions to follow through on their objectives. Common approaches are to take advantage of system weaknesses, misconfigurations, and vulnerabilities. Examples of elevated access include SYSTEM/root level, local administrator, user account with admin-like access, and user accounts with access to specific systems or access to perform specific functions.
3. An exfiltration attack where an adversary is trying to steal data. Exfiltration attacks comprise techniques that adversaries may use to steal data from a network. Upon collecting the data, adversaries often package it to avoid detection during exfiltration. Examples of packaging techniques include compression and encryption. Techniques for exfiltrating data from a target network typically include transferring it over their command and control (C&C) channel or an alternate channel, and may also include placing size limits on the exfiltration transmission.

In a second example for the fourth impact score embodiment, a given score attribute comprises the respective stages (e.g., the first, second and third sub-incidents in the sequence described hereinabove), and the given SOC processor can execute impact score function 44 to compute impact score 102 by analyzing the respective stages. For example, impact score function 44 can assign, to the impact score, lower values for earlier sub-incidents in the sequence and higher values for later sub-incidents in the sequence. For example, in the sequence described hereinabove, impact score function 44 can adjust the impact score as follows:

If the sub-incident comprises a reconnaissance attack, then increase the impact score by 0.05.

If the sub-incident comprises a privilege escalation attack, then increase the impact score by 0.3.

If the sub-incident comprises an exfiltration attack, then increase the impact score by 0.35.

In a third example for the fourth impact score embodiment, the given SOC processor can compute a volume (e.g., a number of bytes) of data uploaded from (i.e., transmitted by) one or more given endpoints 27 involved in the additional incident. In this embodiment, the given SOC processor can execute impact score function 44 so as to compute impact score 102 by analyzing the computed volume. For example, impact score function 44 can assign a higher value to the impact score if the volume exceeds a specified threshold. For example, if the given endpoint involved in the additional incident uploaded more than one gigabyte of data during the additional incident, then impact score function 44 can increase the impact score by 0.3.

In a fourth example for the fourth impact score embodiment, the given SOC processor can compute a count of files accessed or modified by one or more given endpoints 27 involved in the additional incident. In this embodiment, the given SOC processor can execute impact score function 44 so as to compute impact score 102 by analyzing the computed count of files. For example, the given SOC processor can assign a higher value to the impact score if a exceeds a specified threshold. For example, if the given endpoint involved in the additional incident accessed or modified more than 20 files during the additional incident, then impact score function 44 can increase the impact score by 0.2.

In a fifth example for the fourth impact score embodiment, the given SOC processor can determined user privileges (e.g., domain administrator, local administrator and guest) of users accessing (i.e., logged into) endpoints 27 involved in the additional incident. In this embodiment, the given SOC processor can execute impact score function 44 so as to compute impact score 102 by analyzing the determined user privileges. For example, if a given user is accessing a given endpoint 27 involved in the additional incident and has domain administrator privileges, then impact score function 44 can increase the impact score by 0.8. However, if a given user is accessing a given endpoint 27 involved in the additional incident and has guest privileges, then there may be no impact to the impact score.

In a sixth example for the fourth impact score embodiment, the given SOC processor can determine (i.e., derive) roles of endpoints (i.e., hosts) 27 involved in the additional incident. In this embodiment, the given SOC processor can execute impact score function 44 so as to compute impact score 102 by analyzing the determined roles. For example:

If the role of a given endpoint 27 involved in the additional incident is a domain controller, then impact score function 44 can increase the impact score by 0.7.

If the role of a given endpoint 27 involved in the additional incident is a server, then impact score function 44 can increase the impact score by 0.3.

However, if the role of a given endpoint 27 involved in the additional incident is a workstation or a terminal server, then there may be no impact to the impact score.

In step 152, the SOC processor in the given SOC server computes, using a third given function 44, the incident risk score for the additional incident. In some embodiments, the given SOC processor can use the computed confidence and impact scores to compute the incident risk score. The third given function configured to compute incident risk scores 40 may also be referred to herein simply as incident risk score function 44.

In a first risk score embodiment, incident risk score function 44 may compute the incident risk score as:

$$\max(\text{confidence\_score}, \text{impact\_score})$$

wherein confidence_score comprises the computed confidence score for the additional incident, and wherein impact_score comprises the incident score for the additional incident.

In a second risk score embodiment, incident risk score function 44 may compute the incident risk score as:

$$\text{confidence\_score} * \text{impact\_score}$$

In a third risk score embodiment, incident risk score function 44 may compute the incident risk score as:

$$(\text{alpha}*\text{confidence\_score})+(\text{beta}*\text{impact\_score})$$

where alpha and beta comprise values between zero and one.

Finally, in step 154, in response to a predicted label comprising the computed incident risk score, the given SOC processor in the given SOC server prioritizes the additional incident for handling by an SOC analyst, and the method ends. For example, if there are 1,000 daily incidents 32 for a given source 28 and the SOC analysts at the given source have capacity to handle 100 incidents 32 per day, the SOC analysts can prioritize the 100 incidents with the highest incident risk scores 40.

In one embodiment, the given SOC processor in the given SOC server can prioritize the additional incident by prioritizing a notification in response to the predicted label. For example, presenting, on display 33, a notification (e.g., a warning message) comprising an ID, description and the computed incident risk score for the additional incidents. In another embodiment, the given SOC processor can prioritize the notification by presenting the notification in different colors responsively to the computed risk score (e.g., green for lower risks and red for higher risks). In an additional embodiment where there are multiple additional incidents with respective notifications, the given SOC processor can prioritize the additional incidents by presenting their respective notification sorted by their respective incident risk scores (i.e., highest risk first).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, from a plurality of sources, respective sets of incidents, and respective source-assigned suspiciousness labels for the incidents;
applying a set of labeling rules so as to assign rule-based labels to respective incidents in a subset of the incidents in the received sets;
comparing, in each of the incidents in the subset, the respective rule-based label to the respective source-assigned suspiciousness label so as to compute a respective label quality score for each of the sources;
identifying the sources having respective label quality scores meeting a predefined criterion;
fitting, by a processor, a model for computing predicted labels to the incidents received from the identified sources and the respective source-assigned suspiciousness labels of the incidents;
applying the model to an additional incident received from one of the sources to compute at least one score indicating at least one of maliciousness and damage of the additional incident, and to compute a predicted label for the additional incident based on the at least one score; and
prioritizing a notification of the additional incident in response to the predicted label.

2. The method according to claim 1, wherein receiving a given set of incidents from a given source comprises receiving a set of alerts from the given source and grouping the alerts into the given set of incidents.

3. The method according to claim 2, wherein the rule-based labels comprise rule-based incident labels, and wherein applying the labeling rules comprises identifying a subset of the alerts from the given source having matching labeling rules, and applying the labeling rules to identified subset of alerts so as to generate respective rule-based alert labels for the alerts in the subset.

4. The method according to claim 3, wherein the rule-based alert labels have respective priorities, and wherein assigning a given rule-based incident label to a given incident comprises identifying a highest of the priorities, and assigning the identified highest priority to the given rule-based incident label.

5. The method according to claim 2, wherein fitting the model comprises computing an alert bitmask indicating the alerts in each of the incidents.

6. The method according to claim 1, wherein the subset of the incidents comprises the incidents having matching labeling rules.

7. The method according to claim 1, wherein fitting the model comprises computing one or more profile-based features for the incidents.

8. The method according to claim 1, wherein fitting the model comprises computing one or more binned features for the incidents.

9. The method according to claim 1, wherein fitting the model comprises fitting respective models for the sources, and wherein fitting a given model for a given source comprises analyzing the incidents received the sources other than the given source.

10. The method according to claim 1, and further comprising computing respective counts of incidents received from the sources, and wherein fitting the model comprises analyzing the incidents received from the sources whose respective counts exceed a specified threshold.

11. The method according to claim 1, wherein fitting the model comprises fitting respective models for the sources, and wherein fitting a given model for a given source comprises assigning a higher incident weight to the incidents received from the given source, and assigning a lower incident weight to the incidents received from the sources other than the given source.

12. The method according to claim 1, wherein applying the model comprises computing, using the model, a confidence score indicating maliciousness of the additional incident, computing an impact score indicating damage that can be caused by the additional incident, and wherein prioritizing the notification of the additional incident in response to the predicted label comprises prioritizing the notification of the additional incident in response to the confidence score and the impact score.

13. The method according to claim 12, wherein the additional incident comprises a sequence of sub-incidents having respective stages in the sequence, and wherein computing the impact score for each of the sub-incidents comprises analyzing the respective stages of the sub-incidents.

14. The method according to claim 12, wherein receiving the additional incident comprises receiving a set of alerts, and grouping one or more of the alerts into the additional incident.

15. The method according to claim 14, wherein computing the impact score comprises analyzing the grouped one or more alerts.

16. The method according to claim 15, wherein the grouped one or more alerts have respective alert types, and wherein computing the impact score comprises analyzing a given alert type.

17. The method according to claim 15, wherein the one of the sources comprises one or more endpoints, and wherein a given alert comprises a given endpoint accessing a specified Uniform Resource Locator (URL).

18. The method according to claim 15, wherein the one of the sources comprises one or more endpoints, and wherein a given alert comprises a given endpoint executing a command-line that matches a specified string.

19. The method according to claim 15, and further comprising computing a count of the grouped one or more alerts, and wherein computing the impact score comprises analyzing the computed count.

20. The method according to claim 15, wherein the one of the sources comprises one or more endpoints, and further comprising computing a volume of data transmitted by the one or more endpoints during the additional given incident, wherein computing the impact score comprises analyzing on the computing volume of data.

21. The method according to claim 15, wherein the one of the sources comprises one or more endpoints, and further comprising determining a number of files accessed or modified by the one or more endpoints during the additional given incident, wherein computing the impact score comprises analyzing the determined number of files.

22. The method according to claim 15, wherein the one of the sources comprises one or more endpoints, and further comprising determining one or more privileges of a user accessing a given endpoint during the additional given incident, wherein computing the impact score comprises analyzing the determined one or more privileges.

23. The method according to claim 15, wherein the one of the sources comprises one or more endpoints, and further comprising determining a role of a given endpoint during the additional given incident, wherein computing the impact score comprises analyzing the role.

24. An apparatus, comprising:
a memory configured to store a set of labeling rules; and
at least one processor configured:
to receive, from a plurality of sources, respective sets of incidents, and respective source-assigned suspiciousness labels for the incidents, to apply a set of labeling rules so as to assign rule-based labels to respective incidents in a subset of the incidents in the received sets, to compare, in each of the incidents in the subset, the respective rule-based label to the respective source-assigned suspiciousness label so as to compute a respective label quality score for each of the sources, to identify the sources having respective label quality scores meeting a predefined criterion, to fit a model for computing predicted labels to the incidents received from the identified sources and the respective source-assigned suspiciousness labels of the incidents, to apply the model to an additional incident received from one of the sources to compute at least one score indicating at least one of maliciousness and damage of the additional incident, and to compute a predicted label for the additional incident based on the at least one score, and to prioritize a notification of the additional incident in response to the predicted label.

25. A computer software product, the product comprising a non-transitory computer-readable medium, in which program instructions are stored, which instructions, when read by a computer, cause the computer:
to receive, from a plurality of sources, respective sets of incidents, and respective source-assigned suspiciousness labels for the incidents;
to apply a set of labeling rules so as to assign rule-based labels to respective incidents in a subset of the incidents in the received sets;
to compare, in each of the incidents in the subset, the respective rule-based label to the respective source-assigned suspiciousness label so as to compute a respective label quality score for each of the sources;
to identify the sources having respective label quality scores meeting a predefined criterion;
to fit a model for computing predicted labels to the incidents received from the identified sources and the respective source-assigned suspiciousness labels of the incidents;
to apply the model to an additional incident received from one of the sources to compute at least one score indicating at least one of maliciousness and damage of the additional incident, and to compute a predicted label for the additional incident based on the at least one score; and
to prioritize a notification of the additional incident in response to the predicted label.

* * * * *